United States Patent [19]

Young et al.

[11] 4,173,730
[45] Nov. 6, 1979

[54] COMPACT FLUORESCENT LAMP UNIT HAVING INTEGRAL CIRCUIT MEANS FOR DC OPERATION

[75] Inventors: Robert G. Young, Nutley; Edward W. Morton, Teaneck, both of N.J.

[73] Assignee: Westinghouse Electric Corp., Pittsburgh, Pa.

[21] Appl. No.: 923,598

[22] Filed: Jul. 11, 1978

[51] Int. Cl.² .......................... H01J 7/44; H01J 17/34
[52] U.S. Cl. ...................................... 315/53; 313/204; 315/59; 315/DIG. 5
[58] Field of Search ....................... 315/51, 52, 53, 56, 315/57, 58, 59; 313/204

[56] References Cited

U.S. PATENT DOCUMENTS

| Re. 22,896 | 7/1947 | Polevitzky | 313/204 X |
|---|---|---|---|
| 2,121,333 | 6/1938 | Barclay | 313/204 X |
| 2,133,206 | 11/1938 | McCauley | 313/204 |
| 2,824,993 | 2/1958 | DeVriend et al. | 313/485 |
| 3,024,383 | 3/1962 | Doering | 313/204 |
| 3,258,630 | 6/1966 | Scott | 313/204 X |
| 3,508,103 | 4/1970 | Young | 313/493 |
| 3,521,120 | 7/1970 | Anderson | 315/57 |
| 3,551,736 | 12/1970 | Doehner | 315/57 X |
| 3,609,436 | 9/1971 | Campbell | 315/52 X |
| 4,117,372 | 9/1978 | Walz | 315/204 X |

Primary Examiner—Alfred E. Smith
Assistant Examiner—Charles F. Roberts
Attorney, Agent, or Firm—D. S. Buleza

[57] ABSTRACT

A single-ended fluorescent lamp having a partitioned envelope is coupled to a threaded screw-in type base and a module that contains a miniaturized electronic circuit which permits the lamp to be started and operated on direct current from an AC power source. The resulting compact fluorescent lamp unit can thus be used as a direct replacement for incandescent lamps in fixtures that are designed for residential and commercial lighting. Cataphoretic pumping and accumulation of the mercury vapor in the vicinity of the cathode during DC operation and short-circuiting of the partition by the arc discharge are both prevented by a diaphragm assembly at the electrode-end of the envelope which includes a porous gasket of fibrous material that is permeable to mercury vapor but constitutes an impenetrable barrier to the arc. The porous gasket also provides a manufacturing advantage since it establishes a connecting passageway between the tubulated sealed end of the envelope and the envelope proper which permits vapor and gaseous impurities to be quickly evacuated from the envelope before it is charged with fill gas, dosed with mercury and tipped-off.

15 Claims, 5 Drawing Figures

COMPACT FLUORESCENT LAMP UNIT HAVING INTEGRAL CIRCUIT MEANS FOR DC OPERATION

CROSS-REFERENCE TO RELATED APPLICATIONS

The subject matter of this application is related to that disclosed and claimed in concurrently-filed applications Ser. Nos. 923,527 and 923,526 of R. G. Young, the joint author of the present invention, which applications are assigned to the same assignee as the present application.

BACKGROUND OF THE INVENTION

1. Field of the Invention

This invention relates to electric discharge lamps and has particular reference to a compact fluorescent lamp unit adapted for use as a direct replacement for incandescent lamps in fixtures employed for residential and commercial lighting purposes.

2. Description of the Prior Art

Fluorescent lamp units having integral circuit and base components which permit the lamp unit to be screwed into and operated in a socket of a fixture that is designed for incandescent lamps are generally well-known in the art. An electrodeless fluorescent lamp assembly of this type that is energized by a high frequency voltage produced by a self-contained radio-frequency oscillator is disclosed in U.S. Pat. No. 3,521,120 granted July 21, 1970 to J. M. Anderson. Another fluorescent lamp unit which is designed for use in conventional light fixtures and has an envelope that contains concentric annular partitions and electrodes and is coupled to a screw-type base and a ballast component, starter and condenser which permit the lamp to be operated on an AC power supply is disclosed in U.S. Pat. No. 3,551,736 granted Dec. 29, 1970 to G. A. Doehner.

Fluorescent lamps that are designed for direct-current operation and have integral means for counteracting the cataphoretic "pumping" effect which causes the mercury vapor within the operating lamp to accumulate in the region around the cathode are also known in the art. A panel-shaped discharge lamp having partition members that are composed of porous ceramic or vitreous material (or which are provided with inserts of such material) that permit the mercury vapor to circulate within the envelope and between the partitions when the lamp is being operated on a DC power source is disclosed in U.S. Pat. No. 3,258,630 granted June 28, 1966 to W. J. Scott.

A gaseous discharge lamp unit of rectangular configuration in which two sections of straight glass tubing are joined together by U-shaped end members to form an envelope which contains a diaphragm that separates the electrodes but is permeable to mercury vapor and thus prevents the cataphoretic pumping of mercury vapor during DC operation is disclosed in German Patent Application No. 2,549,419 of A. Walz filed Nov. 4, 1975 and opened to inspection May 5, 1977.

Other types of fluorescent lamps that have partitioned envelopes or are provided with fillers or end plugs of glass wool or metal wool for various purposes are described in the following U.S. Pat. Nos.: U.S. Pat. No. 2,121,333 granted June 21, 1938 to Barclay, U.S. Pat. No. 3,024,383 granted Mar. 6, 1962 to Doering, U.S. Pat. No. Re. 22,896 granted July 8, 1947 to Polevitzky, U.S. Pat. No. 3,508,103 granted Apr. 21, 1970 to Young, U.S. Pat. No. 3,609,436 granted Sept. 28, 1971 to Campbell, U.S. Pat. No. 2,133,205 granted Oct. 11, 1938 to McCauley, and, U.S. Pat. No. 2,824,993 granted Feb. 25, 1958 to DeVriend et al.

SUMMARY OF THE INVENTION

While it has long been known in the prior art that the source brightness of a fluorescent lamp could be increased by using a partitioned envelope and that such lamps could then be combined with base and AC-circuit components to provide a screw-in lamp unit suitable for use as a replacement for incandescent lamps in various kinds of lighting fixtures, none of the prior art units combine a partitioned fluorescent lamp with a threaded base member and a circuit module that converts alternating current into direct current to provide a replacement lamp unit that is compact and can be operated in a DC mode in fixtures supplied with AC power. Such compactness and DC-operability are very important from a practical and commercial standpoint since they drastically reduce the radio-frequency noise and alleviate other interference problems encountered with AC circuits and radio-frequency power sources, but permit the lamp units to be used in lighting fixtures designed for incandescent lamps of small physical size without modifying the fixtures in any way.

Moveover, since fluorescent lamps for such direct-replacement markets must be of single-ended construction and have the electrodes located at the same end of the envelope, operating such a screw-in fluorescent lamp unit on direct current inherently created another problem which prevented such units from being commercially feasible and acceptable—namely, the problem of cataphoresis within the operating lamp that causes the mercury vapor to migrate toward and accumulate in the region around the cathode. The resulting "pumping" action lowered the mercury vapor pressure in the main portion of the discharge channel to a point that the arc was eventually extinguished.

All of the foregoing problems are solved in accordance with the present invention by providing a compact single-ended fluorescent lamp of tubular configuration with partition means and a diaphragm assembly that are so constructed that they define a tortuous discharge channel and permit the mercury vapor to pass freely from the cathode region to the anode region of the discharge channel around the partition, when the lamp is operated in a DC mode, without permitting the arc to follow the same path and thus bypass the partition. The diaphragm assembly meets this dual-function objective by means of a porous gasket that is permeable to mercury vapor but constitutes an impenetrable barrier to the arc discharge. This unique lamp is coupled to a screw-in type base component by a circuit module that is attached to the end of the lamp envelope and contains a miniaturized electronic circuit that converts an AC input into a DC output which is used to start and operate the lamp—thus providing a fluorescent lamp unit which has a high light output but is small enough to be used as a direct replacement in incandescent lighting fixtures.

The diaphragm assembly and its porous gasket component not only counteract the cataphoretic effect during DC operation but provide an additional manufacturing advantage since they permit water vapor and gaseous impurities to be evacuated from the lamp through the porous gasket when the lamp is being assembled and also permit the envelope to be quickly charged with a suitable starting gas and dosed with mercury in the usual manner.

BRIEF DESCRIPTION OF THE DRAWINGS

A better understanding of the invention will be obtained from the exemplary embodiments shown in the accompanying drawings, wherein.

DESCRIPTION OF THE PREFERRED EMBODIMENTS

Figure 1:
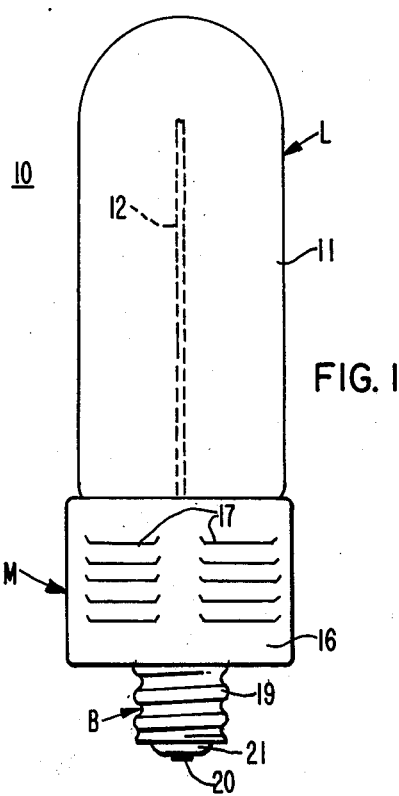
FIG. 1 is an elevational view of a screw-in type fluorescent lamp unit having an integral DC-circuit module according to the invention.
Figure 4:
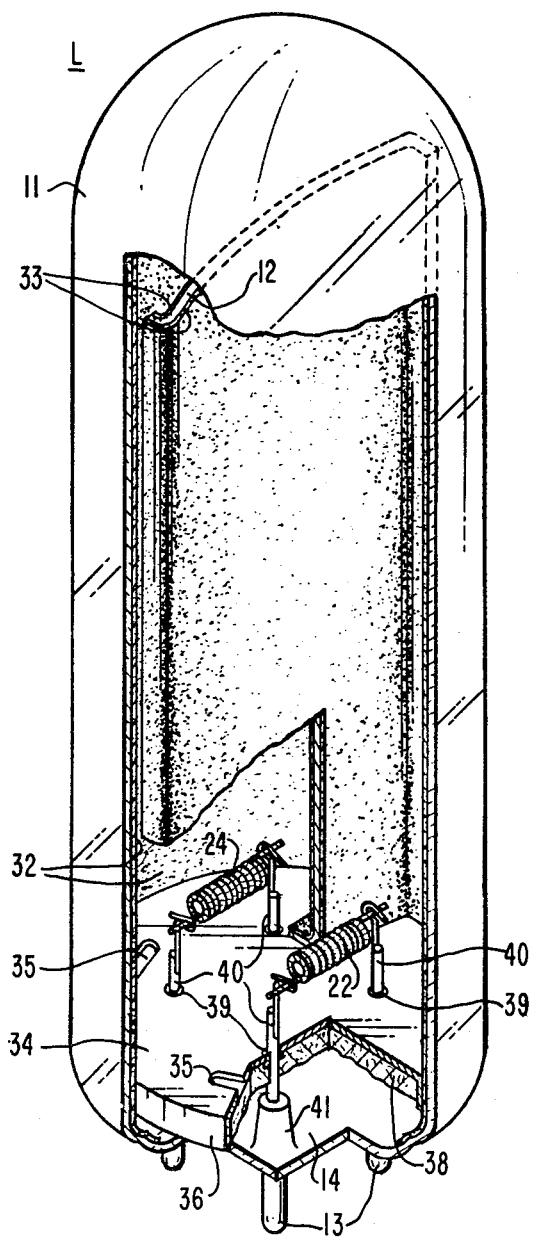
FIG. 4 is a pictorial view of the fluorescent lamp component shown in FIG. 1, parts of the lamp structure being removed to illustrate the diaphragm assembly at the sealed end of the envelope.
Figure 5:
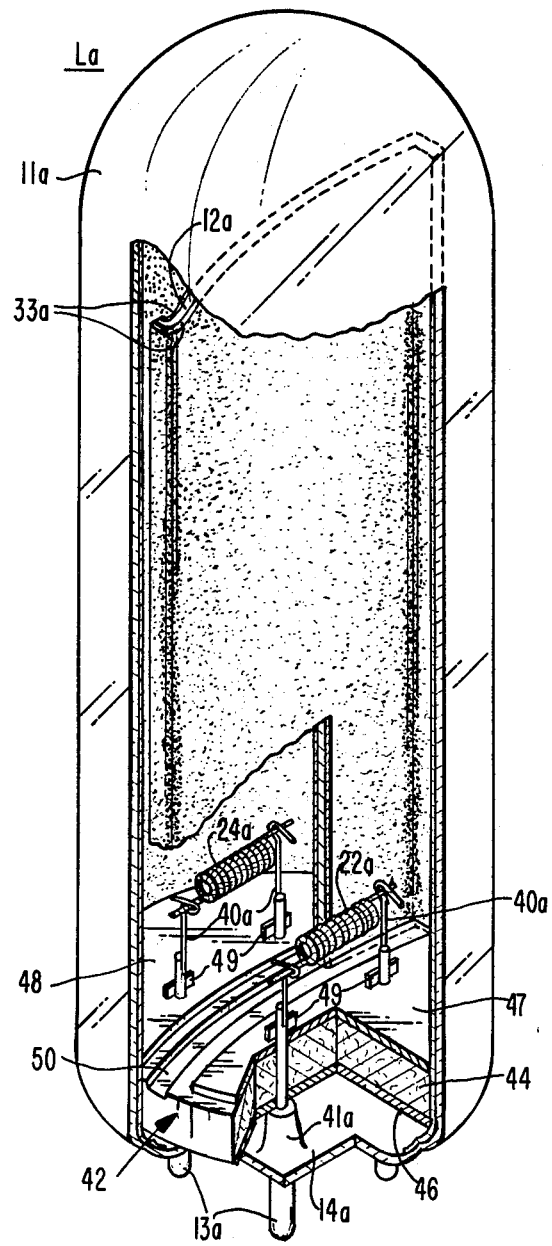
FIG. 5 is a similar view of an alternative fluorescent lamp embodiment of single-ended construction having a modified form of diaphragm and porous gasket assembly.

As shown in FIG. 1, the screw-in discharge lamp unit 10 of the present invention consists of three components, namely, a low-pressure electric discharge lamp L of single-ended construction, a module M that is coupled to the sealed end of the discharge lamp and contains the starting and operating circuit, and a suitable base component B which is attached to the circuit-module and is preferably of the threaded type and thus permits the lamp unit to be screwed into incandescent lamp sockets employed in various kinds of lighting fixtures. The lamp L is preferably of the fluorescent type and has a vitreous envelope 11 of tubular shape that contains a planar partition component 12 which defines a continuous discharge channel of tortuous configuration. The structural details of the lamp L will be described when the exemplary lamp embodiments shown in FIGS. 4 and 5 are discussed.

The circuit-module M contains a miniature electronic circuit which is designed to convert an AC voltage into a DC voltage which is applied to the lamp electrodes and thus energizes the lamp L when the threaded base B is screwed into the socket of an incandescent-lamp fixture and the latter is switched on. The module M is preferably releasably coupled to the lamp L by suitable connector means and the base component B can either be permanently attached or releasably secured to the module.

Figure 2:
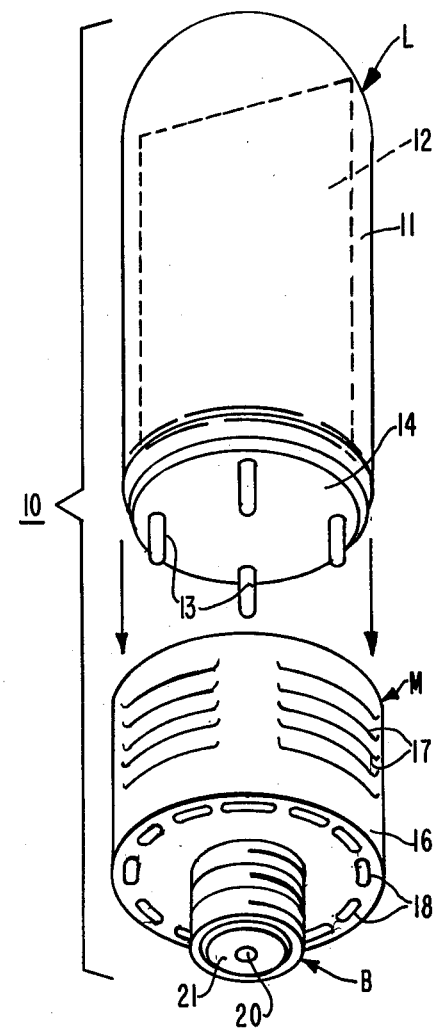
FIG. 2 is an exploded perspective view of the fluorescent lamp and DC-circuit module and base components which comprise the lamp unit.

The coupling arrangement illustrated in FIG. 2 is preferred since it permits the fluorescent lamp L to be simply plugged into and withdrawn from the circuit-module M by means of two pairs of projecting contactors such as metal pins 13 which constitute the lamp terminals and are anchored in the end wall 14 of the envelope 12. The pins 13 releasably engage suitable sleeve or prong type contactors (not shown) in the circuit-module M and thus mechanically and electrically couple these two components together with the module seated against the sealed end of the envelope 12, as illustrated in FIG. 1. The base component B is permanently secured to the module M so that these two components form an integral assembly that can be screwed into the fixture socket and left in place—thus constituting a permanent part of the lighting fixture and converting it from an incandescent to a fluorescent type fixture. The fluorescent lamp L can then be simply removed when it reaches the end of its useful life and replaced with a new lamp that is plugged into the module-base assembly.

As will be noted in FIGS. 1 and 2, the voltage-converting circuit of the module M is enclosed within a suitable housing such as a cylindrical casing 16 of sheet metal or other durable material that preferably has a series of vent openings 17 in its side wall to permit the circulation of air through the module and maintain the circuit elements at a suitably low temperature during lamp operation. Additional vent openings 18 can be provided around the periphery of the bottom wall of the casing 16 if desired. The base member B is of the Edison type and consists of a threaded metal shell 19 that is fastened to the module casing 16 and is terminated by an end contact 20 that is anchored in an insulator 21 fastened to the end of the base shell. If desired, the casing 16 and base shell 19 can be extruded or otherwise formed from the same material as a single piece or member and the end contact 20 and insulator subsequently secured to the base shell portion 19.

Figure 3:
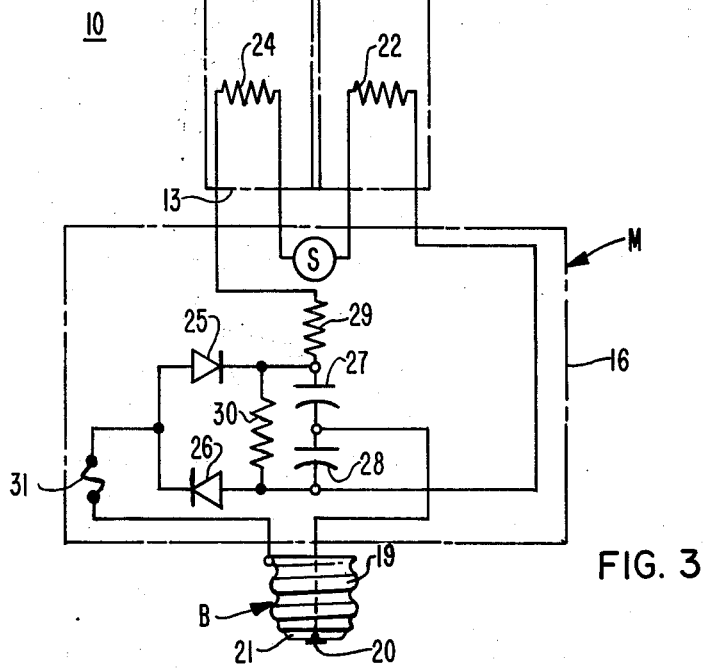
FIG. 3 is a schematic diagram of the preferred voltage-doubling circuit employed in the module showing the manner in which it is connected to the lamp electrodes and the threaded base member.

As indicated schematically in FIG. 3, the lamp L contains a partition assembly 11 that extends longitudinally within the envelope 12 and defines a continuous U-shaped discharge channel. A pair of suitable thermoionic electrodes 22, 24 are located at the respective ends of the channel on opposite sides of the partition and the lamp contains an ionizable medium consisting of a fill gas (such as several Torr of argon) and a dose of mercury. While various kinds of AC to DC converting circuits may be employed to operate the discharge lamp L on direct current from an AC power source, a voltage-doubling circuit of the type shown in FIG. 3 is preferred.

As will be noted, the preferred electronic circuit consists of a pair of diodes 25, 26 that are connected by suitable conductors to a pair of capacitors 27 and 28 in such a manner that during one half-cycle of input AC voltage diode 25 conducts and charges capacitor 27 to full peak voltage, and on the other half-cycle of AC input diode 26 conducts and charges the other capacitor 28 to full peak voltage. Since the capacitors 27, 28 are in series, the resulting open circuit DC voltage across both capacitors is about 2.7 times the input rms voltage and, in the case of a 120 volt 60 Hertz AC power supply, produces approximately 324 volts DC. The DC output of the voltage-doubler circuit is applied to the lamp L by connecting capacitor 27 to one end of electrode 24 through a resistor 29, and capacitor 28 directly to one end of the other electrode 22. A suitable starting component S is connected to the other ends of the electrodes 22, 24 to supply preheat current to the electrodes in the well-known manner. Suitable conductors connect the base shell 19 with the diode network and the base end contact 20 with the capacitor network in the manner illustrated in FIG. 3, thus completing the circuit. A resistor 30 is preferably connected in parallel with the capacitors 27, 28 to insure that they are quickly and completely discharged when the power supply is switched off. As an additional safeguard, a suitable automatic protective component 31 such as a fuse or a thermal cut-out is connected in series with the diode-capacitor network to sense excessive-current operating conditions and open the circuit before any damage or hazardous situation occurs.

When the lamp unit 10 is energized, the DC output of the voltage-doubling circuit is applied to the lamp electrodes 22, 24 in series with the resistor 29 which thus serves as a ballast component and insures stable operation of the lamp L. As soon as the AC input voltage exceeds about 100 volts, the starter S opens and closes, alternatively heating the thermoionic electrodes 22, 24 and concurrently applying the DC output to the lamp L. In the aforementioned case of a 120 volt AC power supply where approximately 324 volts DC was developed by the circuit, this was sufficient to start an experimental "four pass" type partition lamp approximately 16 cms. long and 5.3 cms. in diameter within two seconds and operate it at a current of 330 ma and 67 volts DC with the voltage across the capacitors 27, 28 reduced to 92 volts.

As a specific example for those desiring to practice the invention, the voltage conversion circuit used to start and operate the aforesaid experimental partition lamp included a ballast resistor of approximately 75 ohms (wirewound type and 10 watt rating), a pair of 10 microfarad capacitors (preferably of the metallized polyester film type), and a pair of silicon diodes (1N4004 type) having a 400 peak reverse voltage rating and capable of carrying 30 amps peak surge current and 1 amp average half-wave rectified forward current. The starter S was an "FS-400" type marketed by Dura Corporation, Newark, N.J., and widely used and well known in the fluorescent lamp industry, and a 3 amp fuse was used as the protective component. The "bleeding" resistor 30 was a 0.47 megohm resistor of the carbon type having a 0.5 watt rating. The aforesaid components were of such size that they fit within a cylindrical casing approximately 7 cms. long and 5 cms. in diameter.

If desired, one or more of the circuit components can be mounted within the base shell 19 to reduce the size of the module M.

In accordance with the present invention, the cataphoretic "pumping" of mercury vapor and mercury ions during DC operation of the fluorescent lamp L, and the resulting accumulation of mercury vapor in the region of the cathode, is avoided by placing a suitable diaphragm assembly at the sealed end of the lamp envelope 11 which permits the mercury vapor to migrate from the cathode region to the anode region without permitting the arc to bypass the partition component 12. A compact tubular fluorescent lamp L that embodies this feature is shown in FIG. 4 and will now be described.

As will be noted, lamp L consists of a tubular glass envelope 11 that has a dome-shaped end and its inner surface coated with a layer 32 of a suitable ultraviolet-responsive phosphor. The partition component 12 has flanged side edges and consists of a sheet of relatively rigid material (such as glass, ceramic, fiberglass or a suitable sheet metal) that extends longitudinally within the envelope 11 and is also coated with a suitable ultraviolet-responsive phosphor 33. The end portion of the partition 12 is also flanged and is secured to a rigid septum or diaphragm assembly 34 that extends across the interior of the envelope 11 below the thermoionic coiled electrodes 22 and 24. The diaphragm 34 can be fabricated from a suitable non-conductive material (such as mica) or from sheet metal and has a series of ports or openings 35 along its periphery which provide passageways from one end of the discharge channel to the other and thus permits the mercury vapor to freely circulate within the cathode and anode regions of the lamp L and thus remain diffused throughout the envelope 11.

When the lamp is operated on DC, the arc is prevented from bypassing the partition 12 and jumping directly between the electrodes 22, 24 through the port openings 35 in the diaphragm 34 by providing the diaphragm with a peripheral flange 36 that snugly overlies and preferably engages the side walls of the envelope 12, and also by lining the diaphragm 34 with a porous body of suitable material which serves as a gasket 38 that is permeable to mercury vapor but is of sufficient thickness to constitute a barrier to the arc. While the porous gasket 38 can be fabricated from any suitable material (such as glass wool or quartz wool) that is electrically non-conductive and will not short-circuit the lead wires 40 which support the electrodes 22, 24 or contaminate the lamp, satisfactory results have been obtained by using a soft compliant pad made from interlocked ceramic fibers, such as a felt material composed of silica and alumina fibers that is marketed under the tradename "Fiberfrax" ceramic fiber by the Carborundum Company, Niagara Falls, N.Y. When this material is used, a gasket thickness of from about 1 to 6 millimeters is sufficient to provide the required degree of permeability for mercury vapor diffusion and envelope-evacuation purposes while still providing the necessary protection against arc penetration.

As will be noted in FIG. 4, the lead-in conductors 40 which support the electrodes 22, 24 are anchored in bosses 41 that constitute parts of the glass wafer-like stem 14 which is sealed to the end of the envelope 11 and forms its end wall. The wafer stem 14 is provided with a glass tubulation (not shown) through which the envelope 11 is evacuated during lamp manufacture and subsequently charged with a suitable fill gas (such as argon at approximately 4 Torr) and dosed with a measured quantity of mercury. The porous gasket component 38 of the diaphragm assembly 34 thus permits water vapor and gaseous impurities to be quickly evacuated from the envelope 11 through the port openings 35 in the diaphragm and insures that the envelope is substantially free of such contaminants before it is sealed.

If diaphragm 34 is made of sheet metal, as shown in FIG. 4, then suitable insulator bushings 39 of ceramic or the like are placed around the lead-in conductors 40 to prevent them from being short-circuited.

An alternative single-ended fluorescent lamp embodiment $L_a$ that is suitable for use in the compact lamp unit 10 is shown in FIG. 5. The same type of flanged partition assembly 12a and domed tubular envelope 11a are employed together with a pair of suitable thermionic electrodes 22a and 24a that are held in place by lead-in conductors 40a which are anchored in a wafer stem 14a, as in the previous embodiment. However, in accordance with this embodiment the diaphragm assembly 42 consists of a porous pad-like gasket 44 of soft compliant material (such as the aforementioned "Fiberfrax" ceramic fibers) that is held in place at the sealed end of the envelope 11a by a panel 46 of suitable non-conductive material (such as mica) that is seated on top of the stem bosses 41a. Accidental displacement of the gasket 44 toward the electrodes is prevented by a pair of generally semicircular retaining panels 47, 48 that are held in place on top of the gasket by metal tabs 49 which are welded or otherwise secured to the lead wires 40a. The retaining panels are so shaped and dimensioned that a slot 50 is provided to accommodate the non-flanged end edge of the partition 12a and permit it to be seated in nesting engagement with the gasket. Passageways for permitting diffusion of mercury vapor within the operating lamp and around both electrodes, and to facilitate evacuation of the envelope during lamp manufacture, is achieved by leaving portions of the porous gasket 44 exposed along the nested end edge of the partition 12a and around the periphery of the diaphragm assembly 42. If additional passageways are required or desired, then suitable port openings can be provided in the gasket-retaining panels 46, 47 and 48.

While a partition assembly consisting of a single planar member has been employed in the illustrated "two pass" lamp embodiments, it will be obvious to those skilled in the art that "four pass" and "six pass" lamps can also be made by using partition assemblies consisting of a plurality of planar members that are suitably shaped and arranged to provide a continuous discharge channel that traverses the envelope more than twice.

The phosphor material used to coat the partition and envelope components of the fluorescent lamp L is also not critical. However, excellent results from the standpoint of brightness, visual clarity and color-rendition have been obtained in test lamp units using a coating that contains a blend of three different phosphors which emit visible radiations in three different selected regions of the spectrum and provide a so-called "prime color" fluorescent lamp, pursuant to the teachings of W. A. Thornton in the article entitled "Luminosity and Color-Rendering Capability Of White Light", Journal of the Optical society of America, Vol. 61, No. 9, September 1971, p. 1155. The three-phosphor blend can, for example, consist of manganese-activated zinc silicate, europium-activated strontium chloroapatite and europium-activated yttrium oxide.

We claim as our invention:

1. An electric lamp unit adapted for use in a lighting fixture that includes a lamp socket having terminals which are connected to an alternating-current power source when the fixture is energized, said lamp unit comprising, in combination;

an electric discharge lamp of single-ended construction having an envelope which contains (a) a pair of electrodes that are located at the same end of the envelope and on opposite sides of a partition means which defines a tortuous discharge channel and (b) an ionizable medium comprising a material which is in a vaporous state during lamp operation and exhibits a cataphoretic effect when the lamp is operated on direct current that causes the vaporous material to migrate toward and accumulate at the cathode end of the discharge channel and thus extinguish the electric discharge under such direct-current operating conditions, the electrode-containing end of said envelope having external contact means that are connected to said electrodes by lead-in conductors and said envelope end also having an hermetically-sealed component through which the lamp is evacuated when it is being manufactured, a module coupled to said discharge lamp and enclosing circuit means that is connected to said electrodes and is adapted to convert an alternating-current input into a direct-current output which is applied to said electrodes when the circuit means is energized, a base component coupled to said circuit-module and having terminals that are connected to the input portion of said circuit means and are engageable by the lamp socket terminals of the lighting fixture when the lamp unit is placed therein, and means for allowing the vaporous ionizable material, during operation of the lamp in a direct-current mode, to circumvent the partition means at the electrode-containing end of the envelope and thus migrate from the cathode end to the anode end of the discharge channel without permitting the electric discharge to bypass the partition means comprising a transversely-extending diaphragm assembly that is in engagement with said partition means and the walls of the envelope and includes a porous component which is permeable to the vaporous ionizable material but constitutes an impenetrable barrier to the electric discharge, said porous component being so disposed that it also provides a passageway from the hermetically-sealed component of the electrode-containing end of said envelope into the envelope interior which permits water vapor and gaseous impurities to be evacuated from the envelope through said diaphragm assembly during lamp manufacture prior to the closure of said hermetically-sealed component.

2. The electric lamp unit of claim 1 wherein said circuit means comprises a voltage-doubling circuit.

3. The electric lamp unit of claim 1 wherein said electric discharge lamp is of the low-pressure type and said ionizable and vaporizable medium comprises mercury.

4. The electric lamp unit of claim 3 wherein said low-pressure mercury-vapor discharge lamp comprises a fluorescent lamp, the envelope whereof has a coating of ultraviolet-responsive phosphor on its inner surface.

5. The fluorescent lamp unit of claim 4 wherein said partition means and the inner surface of said envelope are both coated with an ultraviolet-responsive phosphor material which comprises a blend of phosphors that emits visible radiations in three different selected portions of the spectrum.

6. The fluorescent lamp unit of claim 4 wherein;
said base component is of the threaded screw-in type, and
said circuit-module is releasably coupled to the fluorescent lamp.

7. The fluorescent lamp unit of claim 6 wherein:
said threaded base component and circuit-module are fastened to each other and comprise an integral assembly, and
the external contact means carried by said fluorescent lamp comprise protruding contactors that plug into and electrically connect with the circuit-module.

8. The fluorescent lamp unit of claim 4 wherein;
said circuit means includes a starter component that is connected to each of the lamp electrodes, and
said circuit means comprises a miniaturized electronic circuit that includes a pair of diodes and a pair of capacitors which are connected in voltage-doubling relationship with one another.

9. The fluorescent lamp unit of claim 8 wherein;
said circuit means also includes a resistor that is electrically oriented to function as a ballast, and said circuit-module includes a housing which has vent openings that are adapted to dissipate heat generated by the ballast resistor during lamp operation.

10. The fluorescent lamp unit of claim 8 wherein said circuit means also includes a ballast component, a resistor electrically arranged to discharge the capacitors when the lamp unit is deenergized, and a protective component for automatically deactivating the circuit and fluorescent lamp under excessive-current operating conditions.

11. The fluorescent lamp unit of claim 10 wherein said protective component comprises a fusible element.

12. The fluorescent lamp unit of claim 4 wherein;
said partition means comprises an elongated assembly having planar surfaces that extend longitudinally within the envelope and define a continuous discharge channel that traverses the envelope in retroverted fashion, and
the porous component of said diaphragm assembly comprises a gasket of fibrous material having a peripheral edge portion that is in contiguous relationship with the surrounding walls of the envelope.

13. The fluorescent lamp unit of claim 12 wherein;
said envelope is of tubular configuration,
the hermetically-sealed component on the end of said envelope comprises a tipped-off vitreous tubulation, and
said fibrous gasket has a peripheral edge portion that conforms to and is in snug engagement with the envelope walls.

14. The fluorescent lamp unit of claim 13 wherein said fibrous gasket comprises a pad-like member that extends completely across the envelope interior and is in nested engagement with one end of the elongated partition assembly.

15. The fluorescent lamp unit of claim 12 wherein said partition assembly is fabricated from sheet metal and is coated with ultraviolet-responsive phosphor.

* * * * *